(12) United States Patent
Shiotsu et al.

(10) Patent No.: US 10,890,356 B2
(45) Date of Patent: Jan. 12, 2021

(54) HEAT EXCHANGE DEVICE AND HEAT SOURCE MACHINE

(71) Applicant: NORITZ CORPORATION, Hyogo (JP)

(72) Inventors: Naoya Shiotsu, Hyogo (JP); Takeshi Ohigashi, Hyogo (JP); Masaki Kondo, Hyogo (JP); Norihide Wada, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 162 days.

(21) Appl. No.: 16/239,545

(22) Filed: Jan. 4, 2019

(65) Prior Publication Data

US 2019/0226719 A1     Jul. 25, 2019

(30) Foreign Application Priority Data

Jan. 24, 2018   (JP) ................................ 2018-009328

(51) Int. Cl.
*F28F 1/30*      (2006.01)
*F24H 9/00*      (2006.01)
(Continued)

(52) U.S. Cl.
CPC ............. *F24H 9/0026* (2013.01); *F24H 1/34* (2013.01); *F24H 1/403* (2013.01); *F24H 1/41* (2013.01);
(Continued)

(58) Field of Classification Search
CPC .......... F24H 9/0026; F24H 1/34; F24H 1/403; F24H 1/41; F24H 8/00; F24H 9/0015;
(Continued)

(56) References Cited

U.S. PATENT DOCUMENTS 3,656,544 A * 4/1972 Howe ....................... F28D 7/06
                                                                165/74
4,275,705 A * 6/1981 Schaus ................ F28D 15/0275
                                                             126/110 R
(Continued)

FOREIGN PATENT DOCUMENTS

CA          2954483 A1 * 1/2016 .............. F28F 1/325
JP         2017207271      11/2017
WO    WO-2018037857 A1 * 3/2018 ............. F24H 1/445

*Primary Examiner* — Claire E Rojohn, III
(74) *Attorney, Agent, or Firm* — JCIPRNET

(57) ABSTRACT

The heat exchange device (200) includes a primary heat exchanger (10), a secondary heat exchanger (20), and a connecting pipe (60). The connecting pipe connects the primary heat exchanger and the secondary heat exchanger. The primary heat exchanger (10) includes a primary heat exchange part (11), a shell plate (12) surrounding the primary heat exchange part, and a body pipe part (13) for cooling the shell plate. The body pipe part (13) is disposed closer to a burner than the primary heat exchange part (11) and is connected to the connecting pipe (60). The primary heat exchange part (11) includes a first heat transfer tube part (111) connected to the body pipe part (13), and a second heat transfer tube part (112) connected to the first heat transfer tube part and disposed on a side opposite to the body pipe part with respect to the first heat transfer tube part.

4 Claims, 9 Drawing Sheets

(51) Int. Cl.
*F24H 8/00* (2006.01)
*F28D 20/02* (2006.01)
*F24H 1/41* (2006.01)
*F24H 1/40* (2006.01)
*F24H 1/34* (2006.01)
*F28D 21/00* (2006.01)
*F28D 1/04* (2006.01)
*F28D 1/047* (2006.01)
*F24H 9/16* (2006.01)

(52) U.S. Cl.
CPC .............. *F24H 8/00* (2013.01); *F24H 9/0015* (2013.01); *F28D 1/0417* (2013.01); *F28D 1/0443* (2013.01); *F28D 1/0477* (2013.01); *F28D 20/02* (2013.01); *F28D 21/0003* (2013.01); *F24H 9/16* (2013.01); *F28D 2021/0024* (2013.01)

(58) Field of Classification Search
CPC ........ F24H 9/16; F28D 1/0417; F28D 1/0443; F28D 1/0477; F28D 20/02; F28D 21/0003; F28D 2021/0024
USPC ......................................................... 165/181
See application file for complete search history.

(56) References Cited

U.S. PATENT DOCUMENTS

| | | | |
|---|---|---|---|
| 6,820,685 B1* | 11/2004 | Carter | F28B 1/06 165/150 |
| 2008/0104960 A1* | 5/2008 | Lomax | F22B 37/40 60/653 |
| 2010/0132632 A1* | 6/2010 | Kaupp | F24H 9/0094 122/235.23 |
| 2016/0010892 A1* | 1/2016 | Kimura | F24H 9/2042 122/14.21 |
| 2016/0025377 A1* | 1/2016 | Matsunaga | F23D 14/586 122/18.4 |
| 2017/0059201 A1* | 3/2017 | Kim | B23P 15/26 |
| 2017/0176047 A1* | 6/2017 | Kondo | B23P 15/26 |
| 2017/0321970 A1* | 11/2017 | Choi | F28F 9/0131 |
| 2018/0031273 A1* | 2/2018 | Cai | F28F 3/12 |
| 2018/0119989 A1* | 5/2018 | Wada | F23Q 3/008 |
| 2018/0216515 A1* | 8/2018 | Takeuchi | F01N 13/10 |
| 2018/0224337 A1* | 8/2018 | Nagasaka | F28D 21/0007 |
| 2018/0304339 A1* | 10/2018 | Ito | F28D 1/0426 |
| 2019/0154300 A1* | 5/2019 | Kondo | F23L 1/00 |
| 2019/0195563 A1* | 6/2019 | Ohigashi | F24H 1/30 |
| 2019/0368818 A1* | 12/2019 | Wada | F24H 1/445 |
| 2019/0390874 A1* | 12/2019 | Kondo | F24H 1/14 |
| 2020/0103142 A1* | 4/2020 | Se | B21D 39/06 |
| 2020/0208923 A1* | 7/2020 | Wada | F28F 1/325 |

* cited by examiner

HEAT EXCHANGE DEVICE AND HEAT SOURCE MACHINE

CROSS REFERENCE TO RELATED APPLICATION

The disclosure claims priority under 35 U.S.C. § 119 to Japanese Application No. 2018-009328 filed Jan. 24, 2018, the entire content of which is incorporated herein by reference.

BACKGROUND

Technical Field

The disclosure relates to a heat exchange device and a heat source machine.

Description of Related Art

Conventionally, a heat source machine equipped with a primary heat exchanger for recovering sensible heat and a secondary heat exchanger for recovering latent heat has been put to use. The primary heat exchanger of the heat source machine may include a shell plate for housing the heat transfer tube and a body pipe part for cooling the shell plate. A heat source machine including the shell plate and the body pipe part is described in Japanese Laid-Open No. 2017-207271 (Patent Document 1), for example.

In the heat source machine described in this publication, the combustion gas generated by the burner is introduced to the primary heat exchanger for recovering sensible heat from above and is led to the lower exhaust duct through the secondary heat exchanger for recovering latent heat via the primary heat exchanger. In the primary heat exchanger, the heat transfer tube and the body pipe part are connected in series to each other. The heat transfer tube is arranged to extend between the side walls of the shell plate. The body pipe part is arranged along the side wall of the shell plate above the heat transfer tube. An end of the heat transfer tube on the water inlet side is connected to the secondary heat exchanger via a connecting pipe. An end of the heat transfer tube on the water outlet side is connected to an end of the body pipe part on the water inlet side. An end of the body pipe part on the water outlet side is connected to a hot water discharge pipe.

RELATED ART

Patent Document

[Patent Document 1] Japanese Laid-Open No. 2017-207271

In the primary heat exchanger of the heat source machine described in the above publication, the amount of heat exchange between combustion gas and water is larger in the heat transfer tube than in the body pipe part. Thus, by introducing water from the secondary heat exchanger into the heat transfer tube via the connecting pipe, the water is effectively heated in the primary heat exchanger. Therefore, the heat exchange efficiency can be improved.

However, since the amount of heat exchange in the heat transfer tube is large, the water flowing into the body pipe part from the heat transfer tube reaches a high temperature close to the hot water discharge temperature. Thus, the water flowing through the body pipe part is at a high temperature close to the hot water discharge temperature. In this case, the high temperature water is likely to cause boiler scale resulting from precipitation of minerals contained in the water inside the pipe, so the body pipe part tends to have boiler scale formed inside. When boiler scale occurs inside the body pipe part, the body pipe part may be blocked by the boiler scale, resulting in cracks of the body pipe part.

The disclosure provides a heat exchange device that can improve the heat exchange efficiency and suppress occurrence of boiler scale inside the body pipe part, and a heat source machine including the heat exchange device.

SUMMARY

A heat exchange device of the disclosure is capable of recovering sensible heat and latent heat of combustion gas supplied from a burner. The heat exchange device includes a primary heat exchanger, a secondary heat exchanger, and a connecting pipe. The primary heat exchanger is for recovering the sensible heat of the combustion gas. The secondary heat exchanger is disposed on a side opposite to the burner with respect to the primary heat exchanger for recovering the latent heat of the combustion gas. The connecting pipe connects the primary heat exchanger and the secondary heat exchanger. The primary heat exchanger includes a primary heat exchange part, a shell plate surrounding the periphery of the primary heat exchange part, and a body pipe part for cooling the shell plate. The body pipe part is disposed closer to the burner than the primary heat exchange part and is connected to the connecting pipe. The primary heat exchange part includes a first heat transfer tube part that is connected to the body pipe part, and a second heat transfer tube part that is connected to the first heat transfer tube part and is disposed on a side opposite to the body pipe part with respect to the first heat transfer tube part.

DESCRIPTION OF THE EMBODIMENTS

Hereinafter, embodiments of the disclosure will be described with reference to the drawings. The arrows in the respective drawings indicate flows of the combustion gas and water as appropriate.

First, the configuration of a heat source machine 100 according to an embodiment of the disclosure will be described with reference to FIG. 1.

Figure 1:
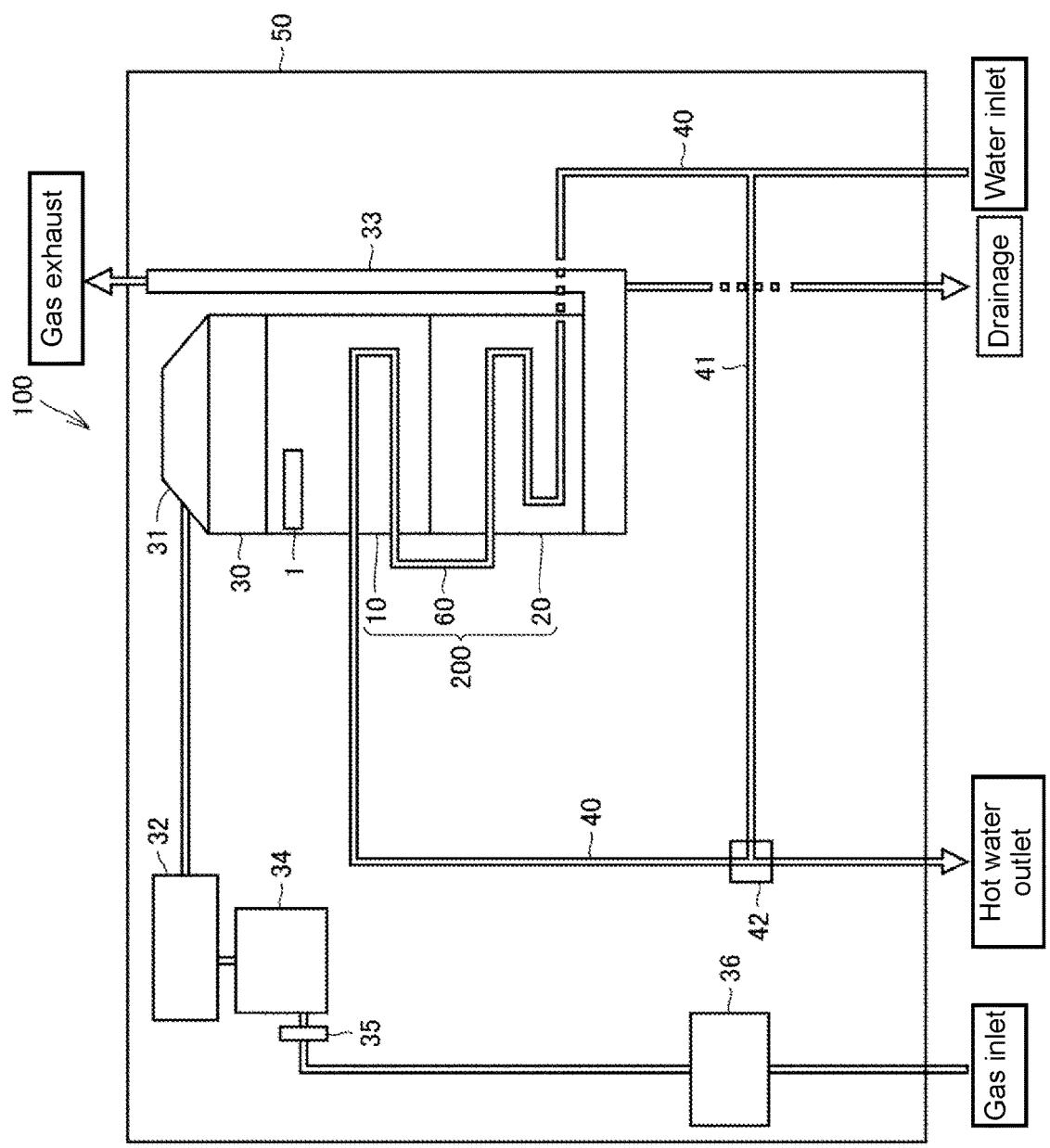
FIG. 1 is a diagram schematically showing the configuration of the heat source machine according to an embodiment of the disclosure.

As shown in FIG. 1, the heat source machine 100 of the present embodiment includes a spark plug 1, a primary heat exchanger (sensible heat recovery heat exchanger) 10, a secondary heat exchanger (latent heat recovery heat exchanger) 20, a burner 30, a chamber 31, a blower device 32, a duct 33, a venturi tube 34, an orifice 35, a gas valve 36, piping 40, bypass piping 41, a three-way valve 42, a case 50, and a connecting pipe 60 as main parts. The primary heat exchanger 10, the secondary heat exchanger 20, and the connecting pipe 60 constitute a heat exchange device 200. All the above parts, except for the case 50, are disposed inside the case 50. The above-mentioned parts are the same as those conventionally known except for the heat exchange device 200.

Fuel gas flows to the venturi tube 34 through the gas valve 36 and the orifice 35. The mixed gas mixed in the venturi tube 34 is sent to the blower device 32. The blower device 32 is for supplying the mixed gas to the burner 30. The blower device 32 is connected to the chamber 31, and the chamber 31 is connected to the burner 30. The mixed gas supplied from the blower device 32 is sent to the burner 30 through the chamber 31. The burner 30 is for generating heating gas (combustion gas) to be supplied to the primary heat exchanger 10. The mixed gas blown from the burner 30 is ignited by the spark plug 1 and turned into combustion gas.

The burner 30, the primary heat exchanger 10, and the secondary heat exchanger 20 are connected for the combustion gas to sequentially pass through the primary heat exchanger 10 and the secondary heat exchanger 20 to exchange heat with hot water. The burner 30 is disposed on the side opposite to the secondary heat exchanger 20 with respect to the primary heat exchanger 10. The burner 30 is configured to supply combustion gas in the order of the primary heat exchanger 10 and the secondary heat exchanger 20. In the present embodiment, the burner 30 is disposed above the primary heat exchanger 10. In other words, the burner 30 is a reverse burning type burner. Nevertheless, the burner 30 may be a regular burning type burner.

The duct 33 is connected to the secondary heat exchanger 20 and the duct 33 extends outside the case 50. Thus, the combustion gas that has passed through the secondary heat exchanger 20 is discharged outside the case 50 through the duct 33. The portion of the piping 40 on the hot water discharge side of the primary heat exchanger 10 and the bypass piping 41 are connected by the three-way valve 42.

Figure 2:
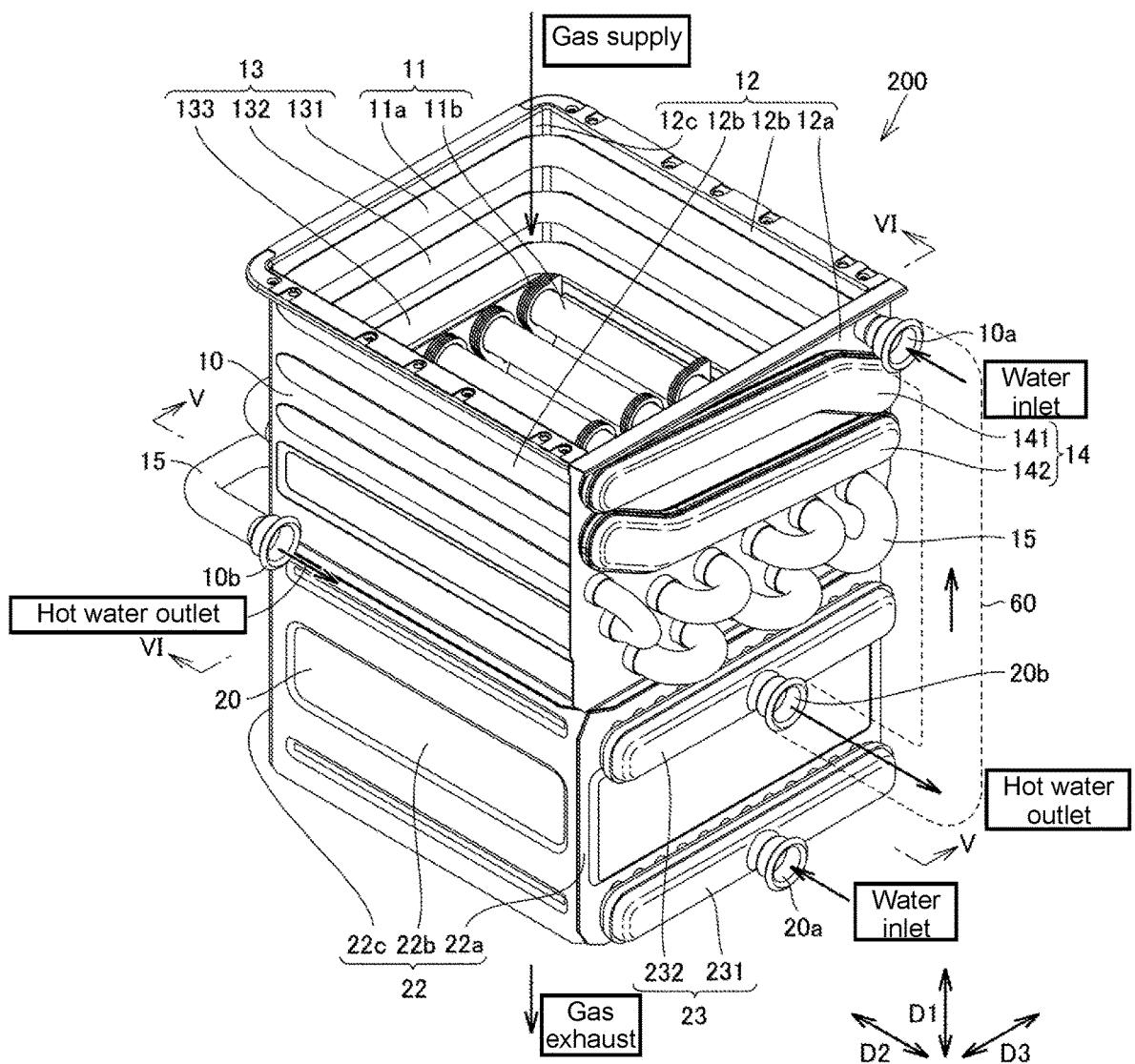
FIG. 2 is a perspective view schematically showing the configuration of the heat exchange device according to an embodiment of the disclosure.
Figure 3:
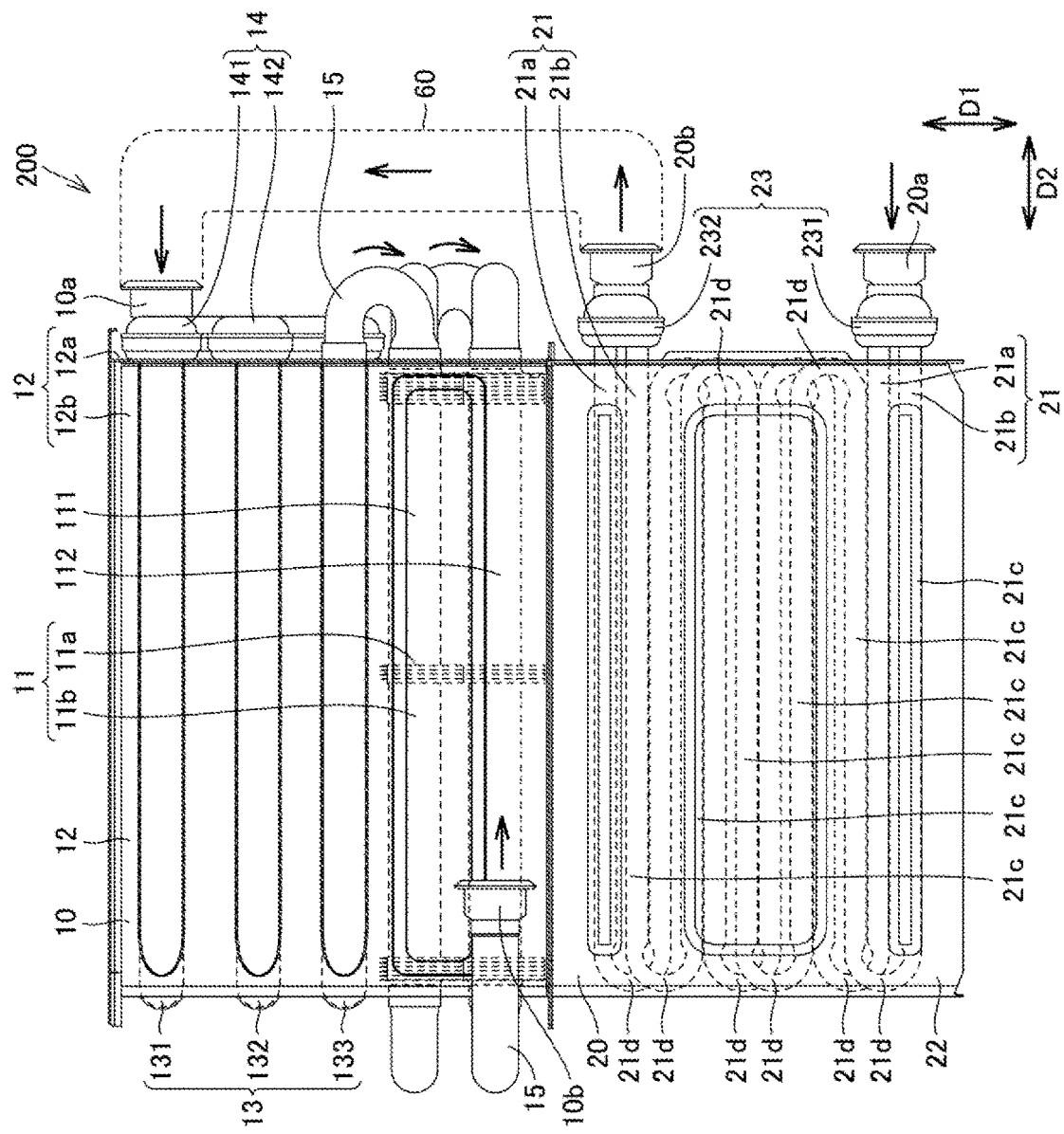
FIG. 3 is a side view showing the internal structure of the heat exchanger according to an embodiment of the disclosure in broken lines.

Next, the configuration of the heat exchange device 200 of the present embodiment will be described with reference to FIG. 2 to FIG. 6. For convenience of description, the connecting pipe 60 is shown in broken lines in FIG. 2, FIG. 3, and FIG. 5, and the connecting pipe 60 is not shown in FIG. 4 and FIG. 6. As shown in FIG. 2 and FIG. 3, the heat exchange device 200 can recover sensible heat and latent heat of combustion gas. The heat exchange device 200 includes the primary heat exchanger 10, the secondary heat exchanger 20, and the connecting pipe 60.

The primary heat exchanger 10 is for recovering sensible heat of combustion gas. The secondary heat exchanger 20 is for recovering latent heat of combustion gas. The secondary heat exchanger 20 is disposed on the side opposite to the burner 30 with respect to the primary heat exchanger 10. The connecting pipe 60 connects the primary heat exchanger 10 and the secondary heat exchanger 20. The connecting pipe 60 is made of metal, resin, or the like, for example. The primary heat exchanger 10 and the secondary heat exchanger 20 are disposed to overlap in the first direction D1. The secondary heat exchanger 20 is disposed to overlap the primary heat exchanger 10 in the vertical direction (up-down direction) in a state where the heat exchange device 200 is installed. That is, in the state where the heat exchange device 200 is installed, the first direction D1 is the up-down direction.

The primary heat exchanger 10 includes a first inlet part 10a, a first outlet part 10b, a primary heat exchange part 11, a shell plate 12, a body pipe part 13, a header member 14, and a bent pipe 15. The first inlet part 10a is the part where hot water first enters the primary heat exchanger 10. The first inlet part 10a is connected to the body pipe part 13. In addition, the first inlet part 10a is connected to the connecting pipe 60. The first outlet part 10b is the part where hot water is finally discharged from the primary heat exchanger 10. The first outlet part 10b is connected to the primary heat exchange part 11. In addition, the first outlet part 10b is connected to piping (not shown).

Figure 5:
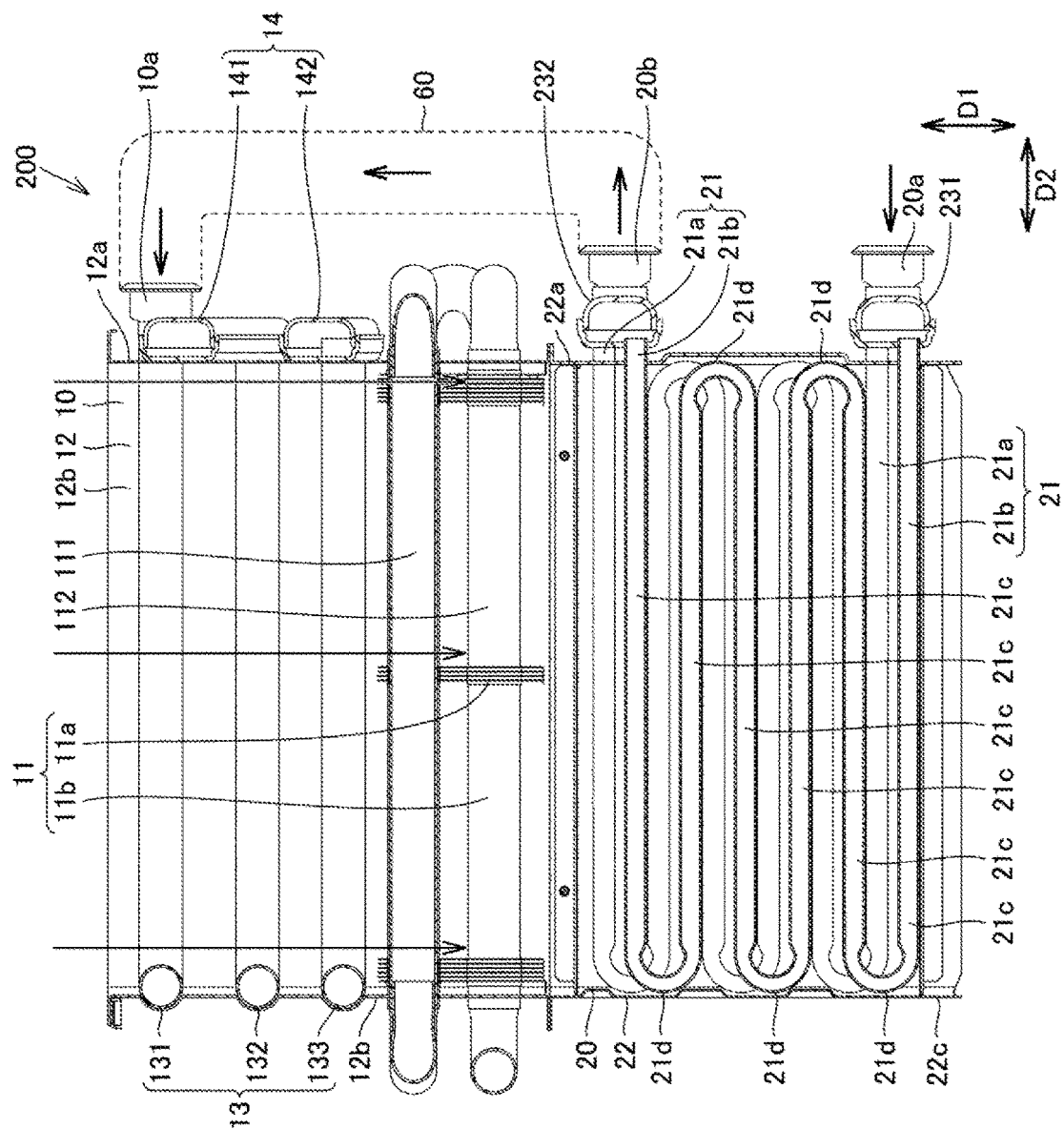
FIG. 5 is a cross-sectional view taken along the line V-V in FIG. 2.

The primary heat exchange part 11 includes a plurality of fins 11a and a plurality of fin pipes 11b. Each of the fins 11a and the fin pipes 11b may be made of SUS (stainless steel). The primary heat exchange part 11 is configured for combustion gas to flow through the outside of the fins 11a and the fin pipes 11b and for water to flow through the inside of the fin pipes 11b. The fins 11a are stacked on one another. The fin pipes 11b penetrate the fins 11a in the stacking direction. For convenience of description, only a part of the fins 11a are shown in FIG. 2, FIG. 3, and FIG. 5.

The fin pipes 11b are arranged in two stages along the first direction D1. In other words, the primary heat exchange part 11 includes a first heat transfer tube part 111 and a second heat transfer tube part 112 arranged in two stages along the first direction D1. The fin pipes 11b arranged in the stage close to the body pipe part 13 constitute the first heat transfer tube part 111. The fin pipes 11b arranged in the stage away from the body pipe part 13 constitute the second heat transfer tube part 112.

The first heat transfer tube part 111 is connected to the body pipe part 13 via the bent pipe 15. The second heat transfer tube part 112 is connected to the first heat transfer tube part 111 via the bent pipe 15. The second heat transfer tube part 112 is disposed on the side opposite to the body pipe part 13 with respect to the first heat transfer tube part 111. The first outlet part 10b is connected to the second heat transfer tube part 112. The body pipe part 13, the first heat transfer tube part 111, and the second heat transfer tube part 112 are connected in series.

In the present embodiment, since the first direction D1 is the up-down direction, the first heat transfer tube part 111 and the second heat transfer tube part 112 are disposed one above the other in the order of the first heat transfer tube part 111 and the second heat transfer tube part 112. In other words, the first heat transfer tube part 111 is disposed above the second heat transfer tube part 112 in the up-down direction.

The shell plate 12 surrounds the periphery of the primary heat exchange part 11. The shell plate 12 includes a front surface part 12a, a pair of side surface parts 12b, and a back surface part 12c. The front surface part 12a, the pair of side surface parts 12b, and the back surface part 12c constitute a quadrangular frame. The shell plate 12 has openings on the upper and lower sides. The shell plate 12 can supply combustion gas to the inside of the shell plate 12 through the opening on the upper side. The shell plate 12 can discharge combustion gas to the outside of the shell plate 12 through the opening on the lower side.

Figure 6:
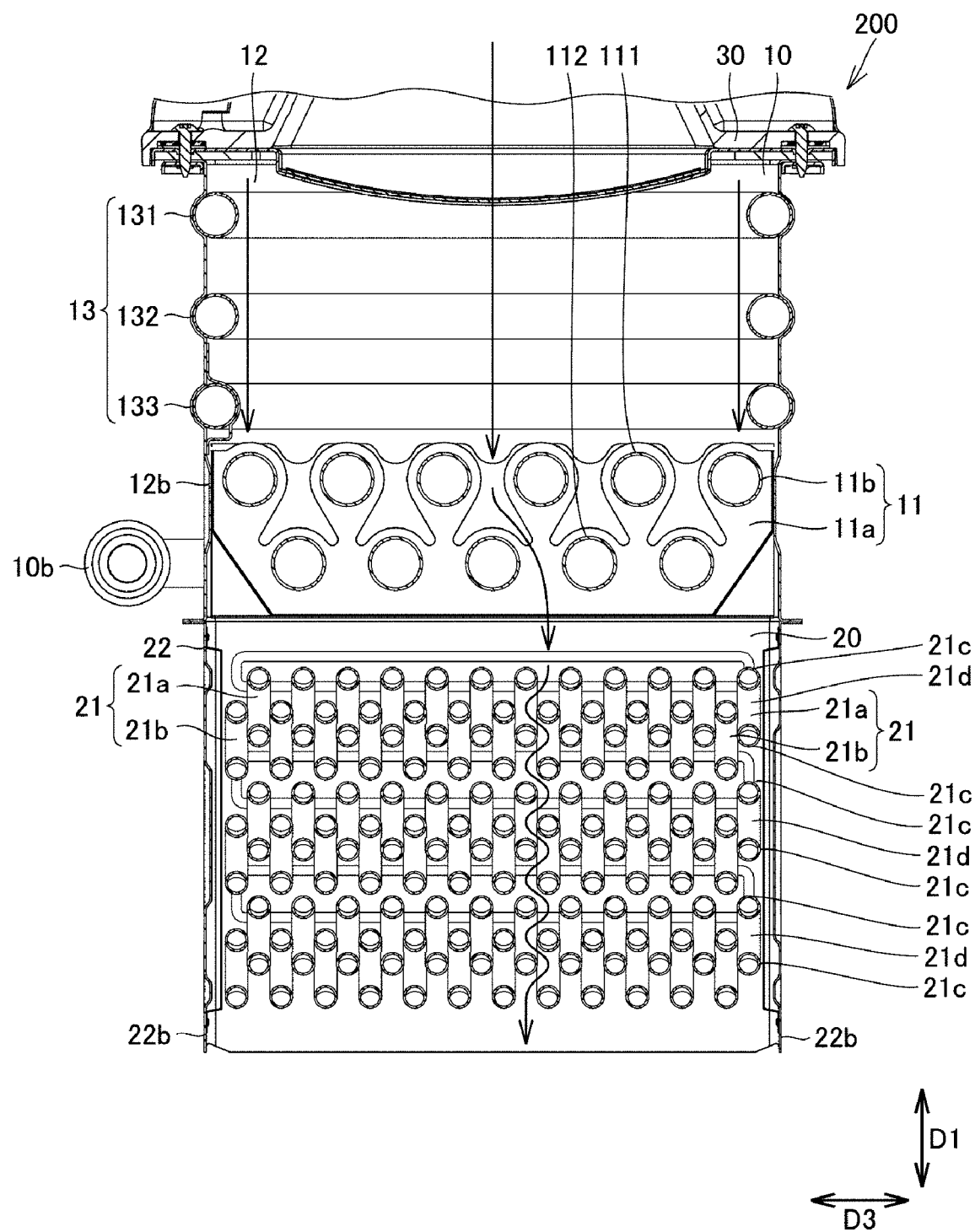
FIG. 6 is a cross-sectional view taken along the line VI-VI in FIG. 2.

The body pipe part 13 is for cooling the shell plate 12. As shown in FIG. 6, the body pipe part 13 is disposed closer to the burner 30 than the primary heat exchange part 11. The body pipe part 13 is connected to the connecting pipe 60. The body pipe part 13 is disposed along the inner surfaces of the pair of side surface parts 12b and the back surface part 12c of the shell plate 12. The body pipe part 13 includes a first cooling pipe 131, a second cooling pipe 132, and a third cooling pipe 133. The first cooling pipe 131, the second cooling pipe 132, and the third cooling pipe 133 are arranged side by side in the first direction D1. The first cooling pipe 131, the second cooling pipe 132, and the third cooling pipe 133 are connected in series via the header member 14. The header member 14 is attached to the front surface part 12a of the shell plate 12. The header member 14 includes a first header member 141 and a second header member 142.

One end of the first cooling pipe 131 is connected to the first inlet part 10a, and the other end of the first cooling pipe 131 is connected to the first header member 141. One end of the second cooling pipe 132 is connected to the first header member 141, and the other end of the second cooling pipe 132 is connected to the second header member 142. One end of the third cooling pipe 133 is connected to the second header member 142, and the other end of the third cooling pipe 133 is connected to the bent pipe 15 disposed at the uppermost position. Further, the fin pipes 11b of the primary heat exchange part 11 are connected in series to each other by the bent pipe 15.

The secondary heat exchanger 20 includes a second inlet part 20a, a second outlet part 20b, a secondary heat exchange part 21, a shell plate 22, and a header member 23. The second inlet part 20a is the part where hot water first enters the secondary heat exchanger 20. The second inlet part 20a allows water to flow into the secondary heat exchanger 20. The second inlet part 20a is connected to piping (not shown). The second outlet part 20b is the part where hot water is finally discharged from the secondary heat exchanger 20. The second outlet part 20b is connected to the connecting pipe 60. In other words, the second outlet part 20b is connected to the first inlet part 10a via the connecting pipe 60. As shown in FIG. 6, the second outlet part 20b is disposed closer to the burner 30 than the second inlet part 20a.

The first inlet part 10a, the first outlet part 10b, the second inlet part 20a, and the second outlet part 20b are all disposed to open in the same direction. In the present embodiment, the first inlet part 10a, the first outlet part 10b, the second inlet part 20a, and the second outlet part 20b are all disposed to open in the second direction D2.

Figure 4:
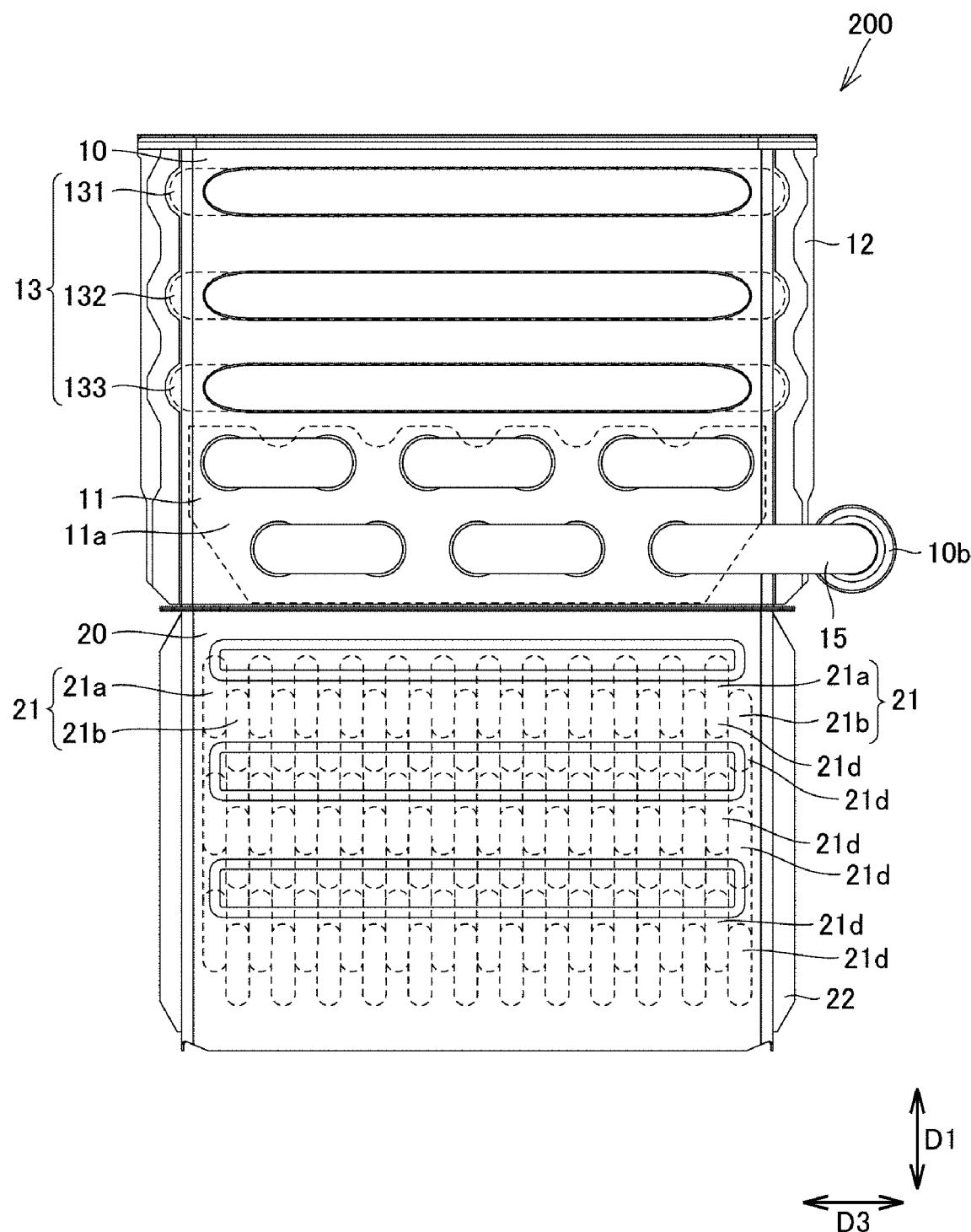
FIG. 4 is a back view showing the internal structure of the heat exchange device according to an embodiment of the disclosure in broken lines.

As shown in FIG. 3 to FIG. 5, the secondary heat exchange part 21 includes a plurality of first pipes 21a and a plurality of the second pipes 21b. Each of the first pipes 21a and the second pipes 21b may be made of SUS (stainless steel). The secondary heat exchange part 21 is configured for combustion gas to flow through the outside of each of the first pipes 21a and the second pipes 21b and for water to flow through the inside of the first pipes 21a and the second pipes 21b.

Each of the first pipes 21a and the second pipes 21b is a meandering pipe (meander). Each of the first pipes 21a and the second pipes 21b is configured to turn back alternately in the second direction D2 orthogonal to the first direction D1. The first pipes 21a and the second pipes 21b are stacked on one another in the third direction D3 orthogonal to both the first direction D1 and the second direction D2. Each of the first pipes 21a and each of the second pipes 21b are displaced from each other in the first direction D1.

The shell plate 22 surrounds the first pipes 21a and the second pipes 21b. The shell plate 22 includes a front surface part 22a, a pair of side surface parts 22b, and a back surface part 22c. The front surface part 22a, the pair of side surface parts 22b, and the back surface part 22c constitute a quadrangular frame. The shell plate 22 has openings on the upper and lower sides. The shell plate 22 can supply combustion gas to the inside of the shell plate 22 through the opening on the upper side. The shell plate 22 can discharge combustion gas to the outside of the shell plate 22 through the opening on the lower side.

The header member 23 includes a first header member 231 and a second header member 232. The first header member 231 and the second header member 232 are arranged side by side in the first direction D1. The second inlet part 20a is connected to the first header member 231. The second outlet part 20b is connected to the second header member 232.

As shown in FIG. 3 to FIG. 5, each of the first pipes 21a and the second pipes 21b has a plurality of straight parts 21c and a plurality of curved parts 21d. Each of the straight parts 21c extends in the second direction D2. Each of the curved parts 21d extends in the third direction D3. The curved parts 21d connect the straight parts 21c to each other. Each of the first pipes 21a and the second pipes 21b extends in the vertical direction (first direction D1) while meandering through the series-connection of the straight parts 21c and the curved parts 21d.

One end of each of the first pipes 21a and the second pipes 21b is connected to the first header member 231, and the other end of each of the first pipes 21a and the second pipes 21b is connected to the second header member 232. The first pipes 21a and the second pipes 21b are connected in parallel via the first header member 231 and the second header member 232.

Next, the flow of combustion gas and the flow of water in the heat exchange device 200 will be described with reference to FIG. 2, FIG. 3, FIG. 5, and FIG. 6. For convenience of description, FIG. 6 does not show the area outside the periphery of the portion, which is connected to the heat exchange device 200, of the burner 30.

First, the flow of combustion gas in the heat exchange device 200 will be described. The combustion gas is supplied to the heat exchange device 200 through the opening on the upper side of the primary heat exchanger 10, and the combustion gas is discharged from the heat exchange device 200 through the opening on the lower side of the secondary heat exchanger 20. Specifically, the combustion gas supplied to the primary heat exchanger 10 through the opening provided on the upper side of the shell plate 12 of the primary heat exchanger 10 flows from the upper side to the lower side toward the opening provided on the lower side of the shell plate 12. At this time, the combustion gas flowing through the outside of the body pipe part 13 and the water flowing through the inside of the body pipe part 13 exchange heat. Further, the combustion gas flowing through the outside of the fins 11a and the fin pipes 11b of the primary heat exchange part 11 and the water flowing through the inside of the fin pipes 11b exchange heat.

The combustion gas that has passed through the primary heat exchanger 10 is supplied to the secondary heat exchanger 20 through the opening provided on the upper side of the shell plate 22 of the secondary heat exchanger 20. The combustion gas supplied to the secondary heat exchanger 20 flows from the upper side to the lower side toward the opening provided on the lower side of the shell plate 22. At this time, the combustion gas flowing through the outside of the first pipes 21*a* and the second pipes 21*b* of the secondary heat exchange part 21 and the water flowing through the inside of the first pipes 21*a* and the second pipes 21*b* exchange heat.

Next, the flow of water in the heat exchange device 200 will be described. The hot water flowing from the second inlet part 20*a* of the secondary heat exchanger 20 to the secondary heat exchanger 20 exchanges heat with the combustion gas in the secondary heat exchange part 21 and then is discharged from the second outlet part 20*b*. The water discharged from the second outlet part 20*b* of the secondary heat exchanger 20 enters the first inlet part 10*a* of the primary heat exchanger 10 through the connecting pipe 60. The hot water that enters the primary heat exchanger 10 from the first inlet part 10*a* of the primary heat exchanger 10 exchanges heat with the combustion gas in the primary heat exchange part 11 and then is discharged from the first outlet part 10*b*.

The flow of water in the primary heat exchanger 10 will be further described in detail. The hot water entering the primary heat exchanger 10 from the first inlet part 10*a* flows into the first cooling pipe 131, which is disposed at the uppermost position, of the body pipe part 13. The hot water flowing into the first cooling pipe 131 passes through the first cooling pipe 131 and flows into the second cooling pipe 132 disposed below the first cooling pipe 131 via the first header member 141. The hot water flowing into the second cooling pipe 132 passes through the second cooling pipe 132 and flows into the third cooling pipe 133 disposed below the second cooling pipe 132 via the second header member 142. The hot water flowing into the third cooling pipe 133 passes through the third cooling pipe 133 and flows into the bent pipe 15 disposed at the uppermost position. The hot water flowing into the bent pipe 15 disposed at the uppermost position flows back and forth through a series of water flow paths formed by connecting the fin pipes 11*b* and the bent pipes 15 in series in directions that the front surface part 12*a* and the back surface part 12*c* are opposed to each other. Finally, the hot water is discharged from the first outlet part 10*b*.

Next, the function and effect of the present embodiment will be described in comparison with comparative examples.

Figure 7:
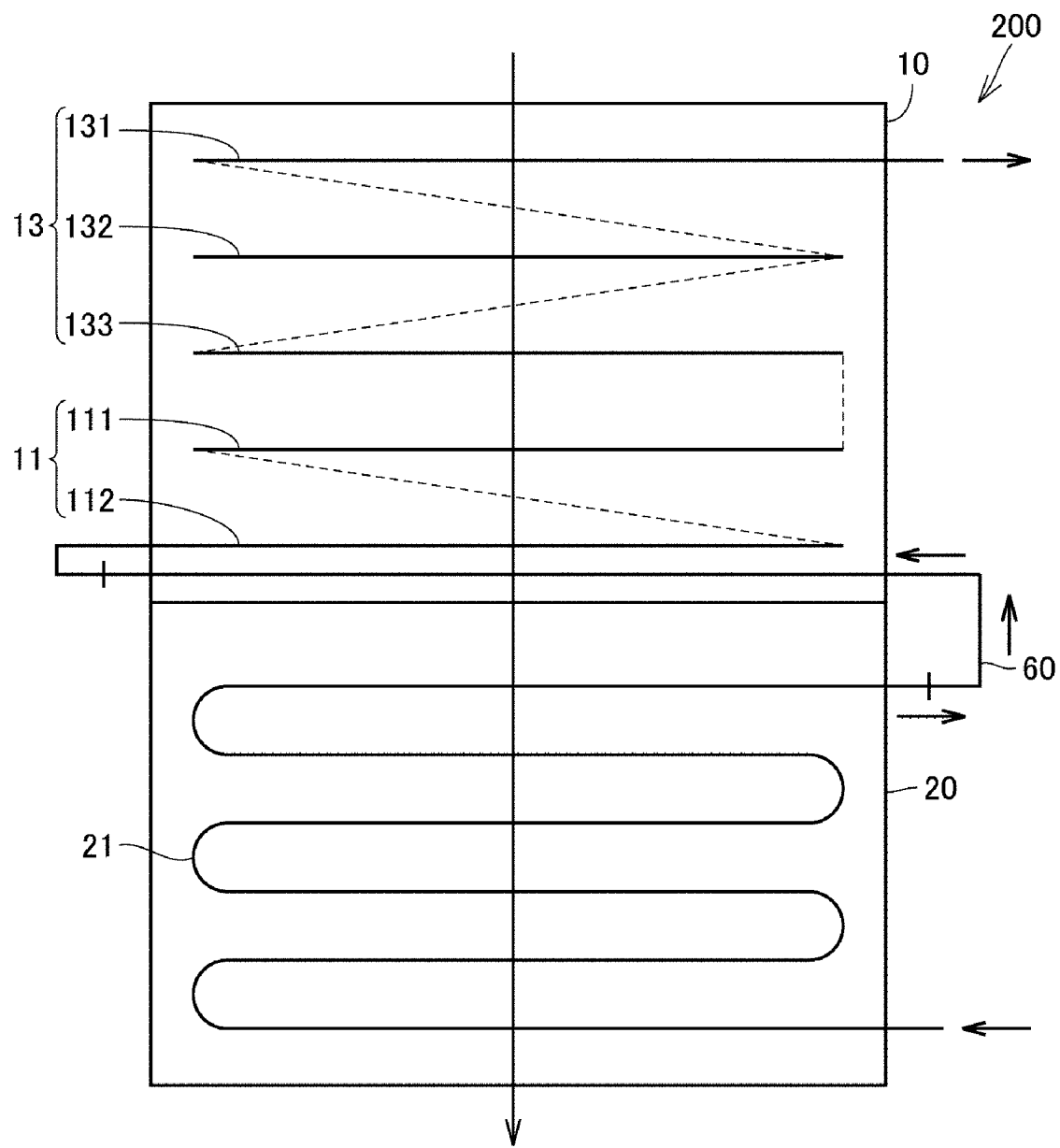
FIG. 7 is a diagram schematically showing the flow path of water flowing through the heat exchange device according to an embodiment of the disclosure.

With reference to FIG. 7, the heat exchange device 200 of Comparative Example 1 is different from the heat exchange device 200 of the present embodiment mainly in that the secondary heat exchanger 20 is connected to the second heat transfer tube part 112 of the primary heat exchanger 10 via the connecting pipe 60.

In the heat exchange device 200 of Comparative Example 1, the water flowing from the secondary heat exchanger 20 to the primary heat exchanger 10 flows in the order of the second heat transfer tube part 112, the first heat transfer tube part 111, and the body pipe part 13. The amount of heat exchange between combustion gas and water is larger in the primary heat exchange part 11 than in the body pipe part 13. Thus, by introducing the water from the secondary heat exchanger 20 into the second heat transfer tube part 112 and the first heat transfer tube part 111 of the primary heat exchange part 11 via the connecting pipe 60, the water is effectively heated in the primary heat exchanger 10. Therefore, the heat exchange efficiency can be improved.

However, since the amount of heat exchange in the first heat transfer tube part 111 and the second heat transfer tube part 112 is large, the water flowing from the first heat transfer tube part 111 into the body pipe part 13 reaches a high temperature close to the hot water discharge temperature. Thus, the water flowing through the body pipe part 13 is at a high temperature close to the hot water discharge temperature. In this case, the high temperature water is likely to cause boiler scale inside the pipe, so the body pipe part 13 tends to have boiler scale formed inside. When boiler scale occurs inside the body pipe part 13, the body pipe part 13 may be blocked by the boiler scale, resulting in cracks of the body pipe part 13.

Figure 8:
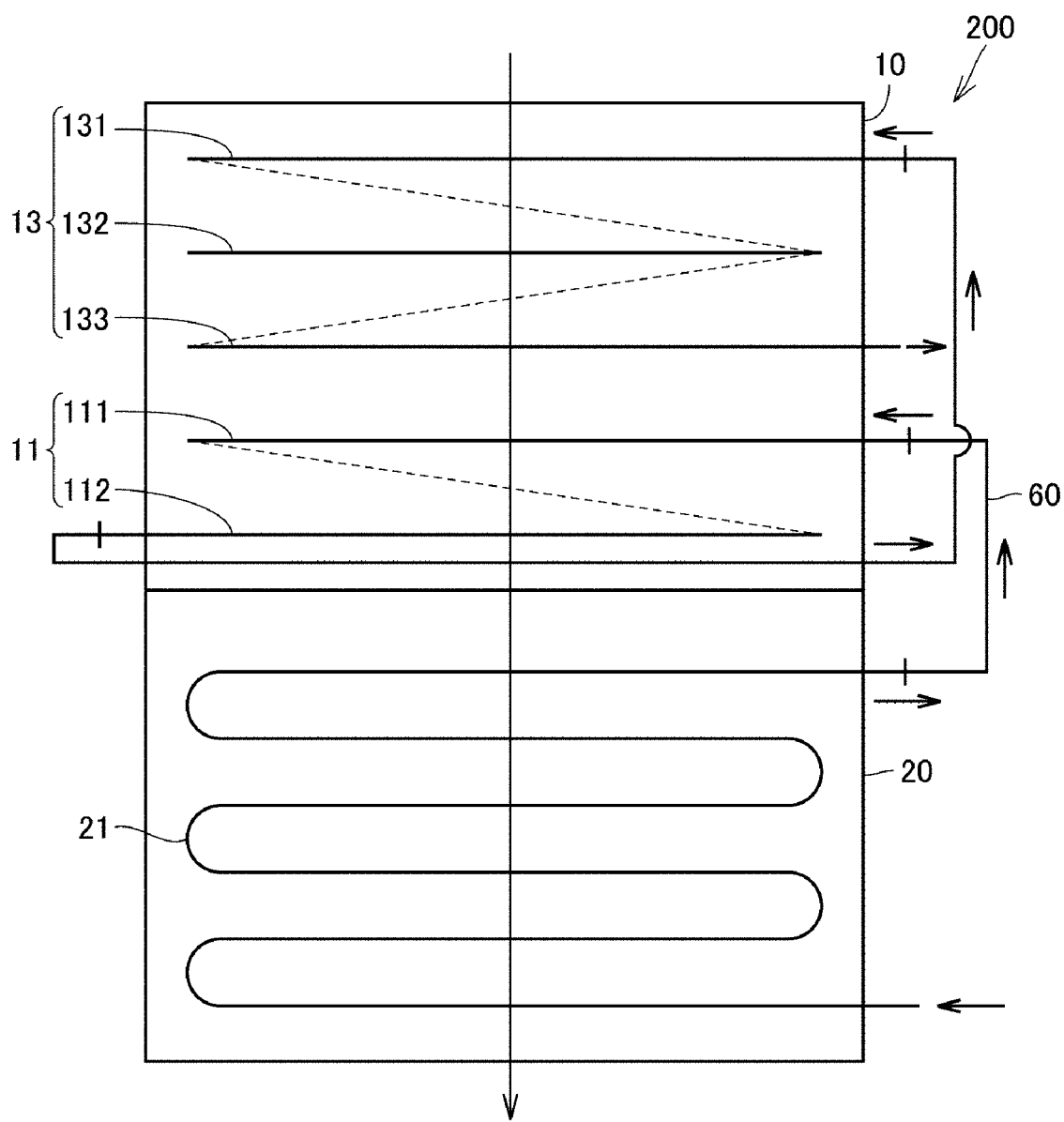
FIG. 8 is a diagram schematically showing the flow path of water flowing through the heat exchange device according to Comparative Example 1.

With reference to FIG. 8, the heat exchange device 200 of Comparative Example 2 is different from the heat exchange device 200 of the present embodiment mainly in that the secondary heat exchanger 20 is connected to the first heat transfer tube part 111 of the primary heat exchanger 10 via the connecting pipe 60.

In the heat exchange device 200 of Comparative Example 2, the water flowing from the secondary heat exchanger 20 into the primary heat exchanger 10 flows in the order of the first heat transfer tube part 111, the second heat transfer tube part 112, and the body pipe part 13. In the heat exchange device 200 of Comparative Example 2, the water flowing from the first heat transfer tube part 111 into the body pipe part 13 also reaches a high temperature close to the hot water discharge temperature. Thus, the water flowing through the body pipe part 13 is at a high temperature close to the hot water discharge temperature. Therefore, the body pipe part 13 tends to have boiler scale formed inside.

Moreover, in the heat exchange device 200 of Comparative Example 2, the water flows from the second heat transfer tube part 112 disposed below the first heat transfer tube part 111 to the body pipe part 13 disposed above the first heat transfer tube part 111 via the connecting pipe 60. Therefore, when discharging water from the primary heat exchanger 10, it is necessary to install a discharge plug to the second heat transfer tube part 112 so as to discharge the water stored in the second heat transfer tube part 112, which causes the problem that the costs increase.

Figure 9:
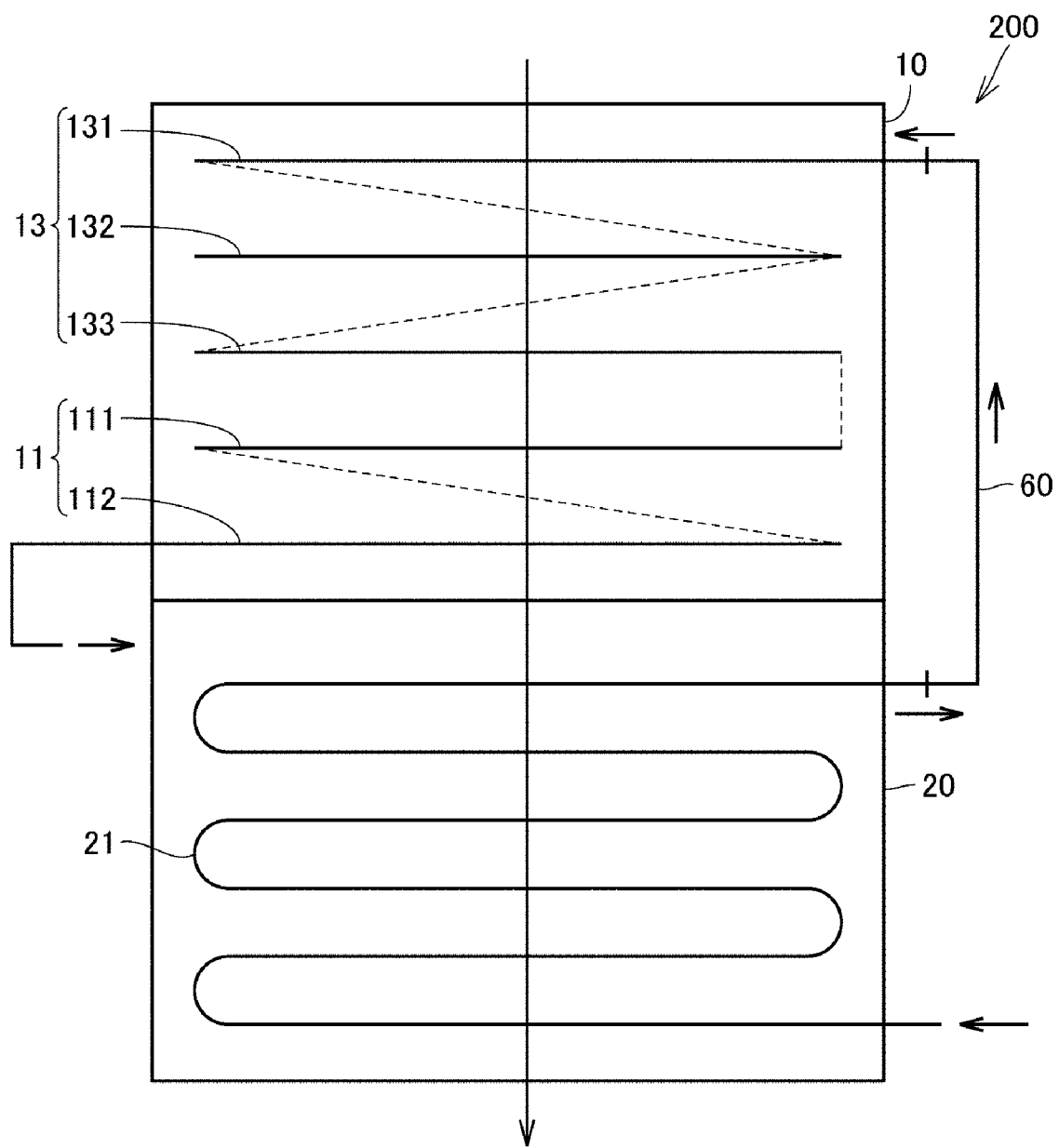
FIG. 9 is a diagram schematically showing the flow path of water flowing through the heat exchange device according to Comparative Example 2.

In contrast to Comparative Example 1 and Comparative Example 2, according to the heat exchange device 200 of the present embodiment, as shown in FIG. 6 and FIG. 9, the first heat transfer tube part 111 is connected to the body pipe part 13 that is disposed closer to the burner 30 than the primary heat exchange part 11. Therefore, the water heated by heat exchange with combustion gas in the body pipe part 13 flows into the first heat transfer tube part 111. Thus, the heat exchange efficiency of the first heat transfer tube part 111 is low as compared with the case where the water flows into the first heat transfer tube part 111 from the secondary heat exchanger 20 without going through the body pipe part 13. However, the primary heat exchange part 11 includes the first heat transfer tube part 111 connected to the body pipe part 13, and the second heat transfer tube part 112 connected to the first heat transfer tube part 111 and disposed on the side opposite to the body pipe part 13 with respect to the first heat transfer tube part 111. Hence, in comparison with the case where the heat transfer tube part is disposed in one stage in the primary heat exchange part 11, the amount of heat exchange of the primary heat exchange part 11 can be improved. As a result, the heat exchange efficiency can be improved.

Furthermore, since the body pipe part 13 is connected to the connecting pipe 60 that connects the primary heat exchanger 10 and the secondary heat exchanger 20, water can flow from the secondary heat exchanger 20 into the body pipe part 13 via the connecting pipe 60. Since the temperature of the water that flows into the body pipe part 13 can be made lower than the temperature of the water that flows from the primary heat exchange part 11 into the body pipe part 13, it is possible to lower the temperature of the water flowing through the body pipe part 13. Thus, it is possible to suppress occurrence of boiler scale inside the body pipe part 13. Therefore, according to the heat exchange device 200 of the present embodiment, it is possible to improve the heat exchange efficiency and suppress occurrence of boiler scale inside the body pipe part 13.

Moreover, in the heat exchange device 200 of the present embodiment, since the first heat transfer tube part 111 is disposed above the second heat transfer tube part 112 in the up-down direction, water flows from the first heat transfer tube part 111 disposed above in the up-down direction to the second heat transfer tube part 112 disposed below. Thus, it is easy to discharge water from the first heat transfer tube part 111 and the second heat transfer tube part 112. As a result, the drainage of the primary heat exchanger 10 can be improved. Furthermore, when discharging water from the primary heat exchanger 10, it is not required to install a discharge plug to the second heat transfer tube part 112 for discharging the water stored in the second heat transfer tube part 112. Therefore, it is possible to prevent increase of the costs.

As shown in FIG. 2 and FIG. 3, in the heat exchange device 200 of the present embodiment, the first inlet part 10a, the first outlet part 10b, the second inlet part 20a, and the second outlet part 20b are all disposed to open in the same direction. Therefore, the connecting pipe 60 connected to the first inlet part 10a and the second outlet part 20b, the piping connected to the first outlet part 10b, and the piping connected to the second inlet part 20a can be respectively connected from the same direction. Thus, the assemblability of the heat exchange device 200 can be improved.

As shown in FIG. 2 and FIG. 6, in the heat exchange device 200 of the present embodiment, the second outlet part 20b is disposed closer to the burner 30 than the second inlet part 20a. Therefore, it is possible to put the direction of flow of the combustion gas supplied from the burner 30 and the direction of flow of the water from the second inlet part 20a to the second outlet part 20b in the secondary heat exchanger 20 opposite to each other. Thus, in the secondary heat exchanger 20, it is possible to exchange heat between water and combustion gas while gradually increasing the temperature of the water from the second inlet part 20a to the second outlet part 20b. As a result, the heat exchange efficiency of the secondary heat exchanger 20 can be improved.

As shown in FIG. 1 and FIG. 6, the heat source machine 100 according to the present embodiment includes the above-described heat exchange device 200 and the burner 30 that can supply combustion gas in the order of the primary heat exchanger 10 and the secondary heat exchanger 20. According to the present embodiment, it is possible to provide the heat source machine 100 including the heat exchange device 200 that can improve the heat exchange efficiency and suppress occurrence of boiler scale inside the body pipe part 13.

According to the heat exchange device of the disclosure, since the first heat transfer tube part is connected to the body pipe part that is disclosed closer to the burner than the primary heat exchange part, the water heated by heat exchange with combustion gas in the body pipe part flows into the first heat transfer tube part. Thus, the heat exchange efficiency of the first heat transfer tube part is low as compared with the case where the water flows into the first heat transfer tube part from the secondary heat exchanger without going through the body pipe part. However, the primary heat exchange part includes the first heat transfer tube part connected to the body pipe part, and the second heat transfer tube part connected to the first heat transfer tube part and disposed on the side opposite to the body pipe part with respect to the first heat transfer tube part. Hence, in comparison with the case where the heat transfer tube part is disposed in one stage in the primary heat exchange part, the amount of heat exchange of the primary heat exchange part can be improved. As a result, the heat exchange efficiency can be improved. Furthermore, since the body pipe part is connected to the connecting pipe that connects the primary heat exchanger and the secondary heat exchanger, water can flow from the secondary heat exchanger into the body pipe part via the connecting pipe. Since the temperature of the water that flows into the body pipe part can be made lower than the temperature of the water that flows from the primary heat exchange part into the body pipe part, it is possible to lower the temperature of the water flowing through the body pipe part. Thus, it is possible to suppress occurrence of boiler scale inside the body pipe part.

In the above heat exchange device, the first heat transfer tube part is disposed above the second heat transfer tube part in the up-down direction. Therefore, water flows from the first heat transfer tube part disposed above in the up-down direction to the second heat transfer tube part disposed below. Thus, it is easy to discharge water from the first heat transfer tube part and the second heat transfer tube part. As a result, the drainage of the primary heat exchanger can be improved.

In the above heat exchange device, the primary heat exchanger includes a first inlet part connected to the body pipe part, and a first outlet part connected to the second heat transfer tube part. The secondary heat exchanger includes a second inlet part for introducing water to the secondary heat exchanger, and a second outlet part connected to the first inlet part via the connecting pipe. The first inlet part, the first outlet part, the second inlet part, and the second outlet part are all disposed to open in the same direction. Therefore, the connecting pipe connected to the first inlet part and the second outlet part, the piping connected to the first outlet part, and the piping connected to the second inlet part can be respectively connected from the same direction. Thus, the assemblability of the heat exchange device can be improved.

In the above heat exchange device, the second outlet part is disposed closer to the burner than the second inlet part. Therefore, in the secondary heat exchanger, it is possible to put the direction of flow of the combustion gas supplied from the burner and the direction of flow of the water from the second inlet part to the second outlet part opposite to each other. Thus, in the secondary heat exchanger, it is possible to exchange heat between water and combustion gas while gradually increasing the temperature of the water from the second inlet part to the second outlet part. As a result, the heat exchange efficiency of the secondary heat exchanger can be improved.

A heat source machine of the disclosure includes the above heat exchange device and the burner capable of supplying the combustion gas in the order of the primary heat exchanger and the secondary heat exchanger. According to the disclosure, it is possible to provide a heat source machine including a heat exchange device that can improve the heat exchange efficiency and suppress occurrence of boiler scale inside the body pipe part.

As described above, according to the disclosure, it is possible to provide a heat exchange device that can improve the heat exchange efficiency and suppress occurrence of boiler scale inside the body pipe part, and a heat source machine including the heat exchange device.

It should be understood that the embodiment disclosed here is exemplary in all aspects and is not restrictive. The scope of the disclosure is defined by the claims rather than the above description, and it is intended to include all modifications within the meaning and scope equivalent to the claims.

What is claimed is:

1. A heat exchange device, capable of recovering a sensible heat and a latent heat of a combustion gas supplied from a burner, the heat exchange device comprising:
    a primary heat exchanger for recovering the sensible heat of the combustion gas;
    a secondary heat exchanger disposed on a side opposite to the burner with respect to the primary heat exchanger for recovering the latent heat of the combustion gas; and
    a connecting pipe connecting the primary heat exchanger and the secondary heat exchanger,
    wherein the primary heat exchanger comprises a primary heat exchange part, a shell plate surrounding a periphery of the primary heat exchange part, and a body pipe part for cooling the shell plate,
    the body pipe part is disposed closer to the burner than the primary heat exchange part and is connected to the connecting pipe, and
    the primary heat exchange part comprises a first heat transfer tube part that is connected to the body pipe part, and a second heat transfer tube part that is connected to the first heat transfer tube part and is disposed on a side opposite to the body pipe part with respect to the first heat transfer tube part,
    wherein the body pipe part extends horizontally along a periphery of the shell plate and is disposed along inner surfaces including a pair of side surfaces and a back surface of the shell plate,
    wherein the first heat transfer tube part is disposed above the second heat transfer tube part in an up-down direction,
    wherein the first heat transfer tube part is located between the body pipe part and the second heat transfer tube part in the up-down direction, and the second heat transfer tube part is located between the first heat transfer tube part and the secondary heat exchanger in the up-down direction.

2. The heat exchange device according to claim 1, wherein the primary heat exchanger comprises a first inlet part connected to the body pipe part, and a first outlet part connected to the second heat transfer tube part,
    the secondary heat exchanger comprises a second inlet part for introducing water to the secondary heat exchanger, and a second outlet part connected to the first inlet part via the connecting pipe, and
    the first inlet part, the first outlet part, the second inlet part, and the second outlet part are all disposed to open in a same direction.

3. The heat exchange device according to claim 2, wherein the second outlet part is disposed closer to the burner than the second inlet part.

4. A heat source machine, comprising:
    the heat exchange device according to claim 1; and
    the burner capable of supplying the combustion gas in an order of the primary heat exchanger and the secondary heat exchanger.

* * * * *